United States Patent [19]

Kulkarni et al.

[11] Patent Number: 4,932,986
[45] Date of Patent: Jun. 12, 1990

[54] CROSS-LINKED GAS SELECTIVE MEMBRANES

[75] Inventors: Sudhir S. Kulkarni, Hoffman Estates; Stephen F. Yates, Arlington Heights; A. Xavier Swamikannu, Des Plaines, all of Ill.

[73] Assignee: Allied-Signal Inc., Morris Township, Morris County, N.J.

[21] Appl. No.: 349,003

[22] Filed: May 9, 1989

[51] Int. Cl.$^5$ .................... B01D 53/22; B01D 71/16
[52] U.S. Cl. ............................... 55/158; 55/16; 536/80
[58] Field of Search ............... 55/16, 158; 210/500.3, 210/500.31, 500.32; 536/69, 80

[56] References Cited

U.S. PATENT DOCUMENTS

| | | | |
|---|---|---|---|
| 2,976,277 | 3/1961 | Touey et al. | 536/69 |
| 3,033,698 | 5/1962 | Kiefer et al. | 106/196 |
| 3,428,584 | 2/1969 | Riley | 210/500.3 X |
| 3,585,126 | 6/1971 | Cannon et al. | 210/500.3 X |
| 3,669,954 | 6/1972 | Schaeffler | 210/500.31 X |
| 3,745,744 | 7/1973 | Perry et al. | 55/16 |
| 3,842,515 | 10/1974 | MacDonald et al. | 34/9 |
| 3,864,289 | 2/1975 | Rendall | 210/500.31 X |
| 4,127,625 | 11/1978 | Arisaka et al. | 55/158 X |
| 4,130,403 | 12/1978 | Cooley et al. | 55/16 |
| 4,430,807 | 2/1984 | Davis et al. | 55/16 X |
| 4,527,999 | 7/1985 | Lee | 55/158 X |
| 4,744,807 | 5/1988 | Minhas et al. | 55/16 X |

FOREIGN PATENT DOCUMENTS

| | | | |
|---|---|---|---|
| 61-278329 | 12/1986 | Japan | 55/158 |
| 62-227421 | 10/1987 | Japan | 55/158 |
| 62-282619 | 12/1987 | Japan | 55/158 |

*Primary Examiner*—Robert Spitzer
*Attorney, Agent, or Firm*—Raymond H. Nelson; Harold N. Wells; Gerard P. Rooney

[57] ABSTRACT

Membranes which are used for the separation of gases comprise cellulose acetate membranes which have been crosslinked with an organic titanate. The membranes are prepared by solvent exchanging a cellulose acetate membrane through a series of baths of decreasing polarity followed by treating the membrane with a crosslinking agent comprising an organic titanate in an organic solvent solution which possesses a relatively low polarity. The resulting membranes will retain the original excellent separation characteristics while concomitantly possessing greater temperature and pressure stability and flux characteristics.

19 Claims, No Drawings

CROSS-LINKED GAS SELECTIVE MEMBRANES

BACKGROUND OF THE INVENTION

The use of semipermeable membranes for reverse osmosis or ultrafiltration process is well known in the art. For example, in a reverse osmosis process for the separation of liquids such as water, a pressure in excess of the osmotic pressure of saline water is applied to the feed solution which is placed in contact with the semipermable membrane. This membrane is permeable to water which will diffuse through the membrane while the sodium chloride molecules and other impurities which may be present in the water are retained by the membrane. The purified water which is recovered as the permeate may then be utilized for personal use such as cooking or drinking.

In addition to the use of semiperable membranes for the separation of liquids, it is now possible to use certain membranes for the separations of various gases. The separation of a gas mixture utilizing a membrane is effected by passing a feedstream of the gas across the surface of the membrane. Inasmuch as the feed stream is at an elevated pressure relative to the effluent stream, a more permeable component of the gas mixture will pass through the membrane at a more rapid rate than will the less permeable component. Therefore, the permeate stream which passes through the membrane is enriched in the more permeable component while, conversely, the residue stream is enriched in the less permeable component of the feed.

This ability to separate gases from a mixture stream has found many applications in commercial uses. For example, gas separation systems can be used for oxygen enrichment of air, for improved combustion efficiencies and conservation of energy resources. Likewise, nitrogen enrichment of air can be applicable where inert atmospheres are required. Other applictions for oxygen enriched gases may be improving selectivity and effciency of chemical and metallurgical processes. Similarly, inert atmospheres such as may be provided for by this invention may also be utilized in chemical and metallurgical processes. Some other applications of gas separation would include helium recovery from natural gas, hydrogen enrichment in industrial process applications, and scrubbing of acid gases. In addition, gas separation systems may be used for environmental benefits, e.g., methane can be separated from carbon dioxide in waste gases for sewage treatment processes and oxygen enriched air can be produced to enhance sewage digestion.

U.S. Pat. No. 3,842,515, discloses a process for preparing cellulose ester membranes which may be used for water desalination in a reverse osmosis process. The process for preparing these membranes involves immersing a water-wet cellulose ester membrane in a water-soluble alcohol until substantially all of the water in the membrane has been replaced by the alcohol. Following this, the alcohol-wet membrane is then further immersed in a non-polar alcoholsoluble organic liquid solution for a period of time which is sufficient to replace the alcohol with the organic liquid, following which the membrane is dried to produce the desired product.

Another U.S. Pat. No. 3,033,698 describes the use of titanium chelate compounds having the formula $(RO)_x$-$Ti(R')_{4-x}$ in which R is an alkyl radical and R' is an oxy compound capable of chelating with titanium for increasing the viscosity of a casting dope comprising cellulose acetate, acetone and water. The increase of the viscosity of the dope is to enable the production of fibers therefrom. The titanium chelates in addition to increasing the viscosity are also used to lightly cross-link the polymer. Inasmuch as only a light cross-linking of the polymer is required the titanium chelates are less reactive in nature. More reactive titanium chelates would result in a high cross-linkage of the polymer and thus turn the solution into a gel which can not be spun into fibers. In contradistinction to this, the present invention utilizing organic titanates will result in a high cross-linking of the cellulose acetate to enable the formation of membranes capable of being utilized for gas separation processes in which the porous membrane will be highly resistant to pressure and temperature. The spinning formulation utilized by the patent will include water and acetone. However the presence of water will adversely affect the degree of cross-linking when used with highly reactive titanates and therefore, the solution which is used in the present invention will not contain any water, the solvents being only organic in nature. Another distinction is that in the patent the polymer is essentially cross-linked in solution while in the present invention the polymer is cross-linked after being formed as a solid membrane.

As hereinbefore set forth, the separation of various gases from a mixture thereof may constitute an important advance in commercial applications. This is becoming increasingly important in view of the necessity to conserve energy. A particular application would relate to increasing the thermal efficiency of combustion processes when utilizing fossil fuels in commercial combustion applications. Also, by utilizing a gas separation membrane in coal gasification, it may be possible to provide an oxygen enrichment of air for the production of low and medium British thermal unit (BTU) product gases as well as an oxygen enrichment of air for the combustion of these gases. For example, by placing a gas membrane separation system in close proximity to both gas production and gas combustion facilities, it would allow a site-located oxygen enrichment plant to supply both processes without the additional expense of transporting the gas or duplicating enrichment facilities. It is also contemplated that the membranes may also be employed in a system utilized to scrub gases such as acid gases, $H_2S$, $CO_2$, etc. from the system.

As will hereinafter be shown in greater detail we have now found that a cellulose acetate membrane which is gas selective in nature may be prepared by cross-linking the cellulose acetate with a particular type of cross-linking agent to produce a membrane which will posses increased temperature and pressure stability, resistane to moisture, and resistance to organic solvents.

BRIEF SUMMARY OF THE INVENTION

This invention relates to cross-linked gas selective membranes. More specifically the invention relates to gas selective cellulose acetate membranes which have been cross-linked by treatment with a particular type of cross-linking agent whereby the finished membrane will possess certain desirable characteristics.

By altering the physical characteristics of a membrane of the type hereinafter set forth in greater detail, it is possible to effect a separation of gases from a mixture thereof in which the selected gas or gases will pass through the membrane with little or no hindrance while gases will be less able to penetrate a membrane and will be rejected or remain in the retentate. By cross-linking cellulose acetate membranes with a particular type of cross-linking agent as exemplified by alkyl titanates it is possible to obtain a gas selective membrane which will posssess a longer stability with regard to the temperatures and pressures which are employed in the separation process and will be more resistant to the deleterious effect of any moisture which may be present in the gaseous feed stream which is passed over the face of the membrane to effect the desired separation of gases present in said stream.

It is therefore an object of this invention to provide a gas selective membrane.

A further object of this invention is to provide cross-linked gas selective cellulose acetate membranes which possess desirable characteristics including flux, selectivity, temperature and pressure stability and resistance to moisture.

In one aspect an embodiment of this invention resides in a gas selective membrane which is prepared by treating a cellulose acetate membrane with a cross-linking agent comprising an organic titanate having the generic formula $TiRR'R''R'''$ in which R, R', R'' and R''' are selected from the group consisting of aroxy, alkaroxy, aralkoxy, alkylketoalkoxy and carboxylate radicals in an organic solvent solution which possesses a low polarity and surface tension at cross-linking conditions, and recovering the resultant cross-linked gas selective cellulose acetate membrane.

A specific embodiment of this invention is found in a gas selective membrane which is prepared by subjecting a cellulose acetate membrane to treatment with a series of solvents of decreasing polarity and surface tension at a temperature in the range of from about 0° to about 50° C. and a pressure within the range of from about atmospheric to about 100 pounds per square inch gauge, further treating said cellulose acetate membrane with a cross-linking agent comprising titanium tetraisopropoxide in a hexame solution at a temperature in the range of from about 0° to about 100° C. and a pressure within the range of from about atmospheric to about 100 pounds per square inch gauge, and recovering the resultant cross-linked gas selective cellulose acetate membrane.

Other objects and embodiments will be found in the following further detailed description of the invention.

DETAILED DESCRIPTION OF THE INVENTION

As hereinbefore set forth the present invention is concerned with cross-linked gas selective membranes which are prepared by cross-linking a cellulose acetate with an alkyl titanate.

Cellulose acetate membranes which may comprise cellulose diacetate, cellulose triacetate or mixtures thereof, the most commonly used material comprising cellulose acetate which posses an acetyl content of from 34% to 40% ordinarily are utilized or ultrafiltration or reverse osmosis purposes. Heretofore, cellulose acetate gas membranes have been prepared from reverse osmosis membranes which have low or no surface porosity membranes and which have been subjected to a drying process to remove the water which is normally present in the membrane. A typical method for removing the water is by a solvent exchange procedure in which the membrane is treated with a water miscible organic solvent which is used to exchange the water in the membrane of the aforesaid solvent. The membrane is then treated with a hydrocarbon solvent which exchanges the water miscible solvent in the membrane for said hydrocarbon solvent. A second method of removing residual water from a reverse osmosis membrane is by freeze-drying; the resultant dry cellulose acetate membrane is also gas perm-selective. Ordinarily, yet another method of removing the water which is present in the membranes is by air drying. However, this simple air drying of water-wet cellulose acetate membranes leads to a destruction of the pore structure of the membrane due to the high surface tension of the water. Inasmuch as the desirable characteristics of a membrane lie in the high flux rate and selectivity, the destruction of the pore surface drastically alters these characteristics and results in lowering the flux rate of the membrane to such a degree so as render said membrane economically unattractive to operate.

It has now been discovered that a gas perm-selective membrane which possesses the desirable characteristics of a relatively high flux, a high selectivity for gases, an incresed temperature stability and a resistance to moisture may be obtained by cross-linking a cellulose acetate membrane with a cross-linking agent comprising an oranic titanate of the type $TiRR'R''R'''$ in which R, R', R'' and R''' are selected from the group consisting of aroxy, alkaroxy, aralkoxy, alkylketoalkoxy and carboxylate radicals in an organic solvent solution which possesses a low polarity and surface tension at cross-linking conditions.

The cellulose acetate membranes which may be prepared according to any method known in the art may be subjected to a series of solvent treatments utilizing solvents which possess varying polarities. The solvents which are employed in this series of treatments will be those with decreasing polarities. The solvents which are employed will be selected from the group consisting of alcohols, paraffinic hydrocarbons, aromatic hydrocarbons, and mixtures thereof. The alcohols which are employed will contain from about 2 to about 5 carbon atoms in the chain such as ethanol, n-propanol, isopropanol, n-butanol, sec-butanol, n-pentanl, etc. The paraffinic hydrocarbons which are employed will be those which contain from about 5 to 8 carbon atoms including pentane, n-hexane, n-heptane, n-octane, as well as isomers thereof, etc. Aromatic hydrocarbons which may be employed will include benzene, toluene, o-xylene, m-xylene, p-xylene, etc. In the preferred embodiment of the invention, when employing mixtures of solvents, the two components of the mixture will be present in equal amounts. Some specific examples of mixtures of the aforementioned solvents will comprise ethanol/pentane, ethanol/hexane, ethanol/heptane, n-propanol/pentane, n-propanol/hexane, n-propanol/heptane, isopropanol/pentane, isopropanol/hexane, isopropanol/heptane, etc. It is to be understood that the aforementioned mixture of organic solvents are only representative of the type of solvent mixtures which may be employed and that the present invention is not necessarily limited thereto. In utilizing the afornentioned mixtures of dissimilar solvents, it is to be understood that the only criteria is that the mixture, when employed in the sequence of solvent treatment steps, must possess a polarity less than the polarity of the solvent previously employed. When the solvent exchange is complete, the cellulose acetate must be free of water.

The treatment of the membrane with the various solvents of decreasing polarity will be effected at treatment conditions which will include temperatures ranging from subuambient to an elevated temperature and will usually be in the range of from about 0° to about 100° C. Although, in the preferred embodiment of the invention, the treatment is effected at atmospheric pressure, it is also, contemplated that superatmospheric pressures will also be employed, the particular operation pressure being within the range of from about atmospheric to about 100 pounds per square inch gauge.

After treatment of the cellulose acetate membranes with the solvents the cellulose acetate membranes are then cross-linked by treatment with an organic titanate of the type hereinbefore set forth. Some representative examples of these titanates which may be employed as the cross-linking agent will include titanium tetraethoxide, titanium tetramethoxide, titanium tetrapropoxide, titanium tetraisopropoxide, titanium tetra-n-butoxide, titanium terra-sec-butoxide, titanium tetra-t-butoxide, the isomeric tetrapentyl titanate, titanium tetrapentoxides, titanium tetrahexoxides, titanium tetraheptoxides, titanium tetraoctoxides, titanium tetramonoxides, titanium tetradecoxides, titanium tetraundecoxides, tetradodecoxides, tetratridecoxides, tetratetradecoxides tetrapentadecoxides, tetrahexadecoxides, titanium tetraphenoxides, titanium cresylates, titanium tetrabenzoxides, titanium acetyl acetonates, etc. The cross-linking is executed by contacting the cellulose acetate membrane with an organic solvent solution of the alkyl titanate. In the preferred embodiment of the invention the alkyl titanate is present in the organic solvent in an amount in the range of from about 0.1% to about 25% by weight, the preferred range being from about 0.1% to about 15%. The amount of alkyl titanate which is employed will be sufficient to afford a final weight percent of titanate in the membrane within a range of from about 0.1 to about 2. Organic solvents which are employed will be those in which the alkyl titanate is soluble, the preferred solvents comprising paraffins such as pentane, hexane, heptane, etc. The cross-linking of the membrane will be effected under cross-linking conditions substantially the same as the solvent treatment conditions and will include temperatures ranging from about 0° to about 50° C. and operating pressures within the range of from about atmospheric to about 100 pounds per square inch gauge. In some cases cross-linking may be completed by evaporating the alcohol by-product in the cross-linking reaction. Evaporation may be accomplished at subambient pressures.

It is also contemplated within the scope of this invention that the wet membrane may be subjected to an annealing process prior to treatment with the solvent without departing from the scope of the invention, said annealing step being optional in nature and not essential to obtaining the desired membrane. For example, if so desired, the cellulose acetate membrane may be annealed by being placed in a hot water bath in which the temperature of the bath is maintained in a range of from about 80° to about 100° C. After being heat-treated for a predeterminded period of time which may range from about 0.5 to about 10 minutes in duration, the annealed membrane is recovered and thereafter subjected to the solvent treatment hereinbefore set forth in a greater detail.

The following examples are given for purposes of illustrating the cross-linked gas selective membranes prepared according to the process herein described and the results which are obtained when employing a cross-linked cellulose acetate membrane of the present invention in contrast to membranes prepared according to other methods known in the art. However, it is to be understood that these examples are merely illustrative in nature and that the present invention is not necessarily limited thereto.

EXAMPLE I

A gas selcetive membrane was manufactured by preparing a solution comprising 19% cellulose acetate, 43% acetone and 38% formamide. The solution was degassed and centrifuged at a rate of 2,000 rpm for a period of 10 minutes. The solution was cast on a polyester backing in which the casting knife was positioned to leave a gap of 8 mil, said backing passed through the solution at a rate of 1 foot per minute. After allowing 13 seconds for evaporation, the membrane was then passed into a gel bath which was maintained at a temperature of 5° C. for a period of 2 minutes and thereafter washed with water at a temperature of 25° C. for a period of 7 minutes.

The membrane was then subjected to a solvent exchange procedure in which the membrane was placed in a 100% isopropanol bath for a period of 30 minutes while maintaining the temperature of the bath at 5° C. The membrane was then placed in a second isopropanol bath which was maintained at room temperature for a period of 5 minutes. Following this the membrane was then placed in a bath comprising a 50/50% mixture of isopropanol and n-hexane for a period of 30 minutes at a temperature of 5° C. The fourth bath treatment comprised placing the membrane in a 100% n-hexane solution for a period of 30 minutes while maintaining the bath at a temperature of 5° C. The cross-linking of the cellulose acetate membrane was accomplished by placing the membrane in a solution of 250 cc of n-hexane which contained 4.3 g of tetrabutyl titanate, the weight percent of titanate in the n-hexane being 2.46% for 60 minutes at ambient temperature. The membrane was then dried in vacuum under tension to prevent curling.

EXAMPLE II

A second membrane was prepared by sujecting a solution of cellulose acetate, acetone and formamide to a procedure similar in nature to that set forth in Example I above. After solvent exchanging the membrane in a series of 4 baths ranging from 100% isopropanol to 50/50% isopropanol/n-hexane and 100% n-hexane, the membrane was cross-linked by placing it in a solution comprising 250 cc of n-hexane contaning 4.3 g of tetra(2-ethylhexyl) titanate for 60 minutes at ambient temperature. The membrane was then dried in vacuum under tension.

EXAMPLE III

In similar manner a cross-linked cellulose acetate membrane was prepared by solvent exchanging a membrane prepared by degasssing and centrifuging a solution of 19% cellulose acetate, 43% acetone and 38% formamide. The solution was cast in a manner similiar to that set forth in Example I above on backing. After gelation and washing the membrane was then subjected to a solvent exchange procedure similar to that set forth in Example I above.

Cross-linking of the cellulose acetate membrane was accomplished by placing the membrane in various solutions of alkyl titanates in n-hexane for 1 hour, followed by drying the membrane. The concentrations of the titanates in n-hexane are listed in Table 1 along with the Atomic Absorption Spectroscopy analyses of the Ti uptake in each case. The titanate pick-up increases with decreasing size of the alkyl group.

TABLE 1

Ti Uptake and Acetone Solubility Results

| Titanate Ti(OR)$_4$, R = | Wt % Titanate in n-C$_6$ | Wt % Ti in Dry Membrane(AAS) | % Wt loss from Membrane after Acetone |
|---|---|---|---|
| TPT, isopropyl | 3.7 | 0.75 | 4.4 |
| TPT, isopropyl | 8.6 | 1.34 | −1.2 |
| TPT, butyl | 9.9 | 1.08 | −0.9 |
| TOT, 2-ethylhexyl | 9.5 | 0.46 | 0.2 |
| Blank | 0 | — | 24.5 |

EXAMPLE IV

A reference membrane was prepared in a manner similar to that set forth in the above examples by preparing a solution of 19% cellulose acetate, 43% acetone and 38% formamide. Again the solution was degassed and centrifuged, following which the solution was cast on a backing. The mmbrane was then passed into a gel bath which was maintained at a temperature of 5° C. for a period of 2 minutes and washed with water.

The cellulose acetate membrane was subjected to a solvent exchange procedure by placing the membrane in 100% isopropanol bath for a period of 30 minutes at a temperature of 5° C. The membrane was then placed in a second isopropanol bath at room temperature for a period of 5 minutes. Thereafter the membrane was then placed in a bath comprising a 50/50% mixture of isopropanol and n-hexane for a period of 30 minutes at a temperature of 5° C. and thereafter in a bath comprising a 100% n-hexane solution for a period of 30 minutes at a temperature of 5° C. The membrane was then dried in air under tension to prevent curling.

EXAMPLE V

A gas separation experiment was preformed in which membranes cross-linked with 2.46% of tetra(ethylhexyl)titanate (TOT) or with tetrabutyl titanate (TBT) (Examples I and II) as well as the reference membranses which were not crosslinked with a titanate (Example IV) were cut into 35 cm$^2$ pieces and placed in a cell. Gases comprising primarily carbon dioxide and primarily nitrogen each with a water content corresponding to a dew point to 18–25° C. were passed through the membranes at a pressure of 50 psig and a temperature of 40° C. The permeablility of the gases through the membrane was measured by a flow meter periodically. The results of this test in which the cellulose acetate membrane crosslinked with tetraoctyltitanate (TOT), the cellulose acetate membrane crosslinked with tetrabutyltitanate (TBT) and the normal cellulose acetate membrane are set forth in Tables 2 and 3 below.

TABLE 2

CO$_2$ and N$_2$ Flux Through Titanate Cross-linked Cellulose Acetate Membranes

| Hours | Temp °C. | Flux (ml/min) TOT | Flux (ml/min) TBT |
|---|---|---|---|
| CO$_2$ | | | |
| 1 | Ambient | 36 | 37.5 |
| 24 | 40 | 52.5 | 50.5 |
| 48 | 40 | 42.5 | 44 |
| 80 | 40 | 48 | 47.5 |
| 168 | 40 | 44 | 43 |
| N$_2$ | | | |
| 0 | Ambient | 1.6 | 1.7 |
| 24 | 40 | 2.05 | 2.1 |
| 48 | 40 | 1.95 | 1.85 |
| 80 | 40 | 1.95 | 2.1 |
| 108 | 40 | 1.98 | 1.9 |
| 132 | 40 | 1.95 | 1.85 |
| 168 | 40 | 1.90 | 1.8 |

TABLE 3

CO$_2$ and N$_2$ Flux Through Reference Uncross-linked Cellulose Acetate Membranes

| Hours | Temp °C. | Flux (ml/min) |
|---|---|---|
| CO$_2$ | | |
| 1 | Ambient | 18.1 |
| 47 | Ambient | 18.8 |
| 48 | 40 | 36 |
| 72 | 40 | 23 |
| 96 | 40 | 18 |
| 120 | 40 | 18 |
| 144 | 40 | 15.5 |
| 168 | 40 | 17.5 |
| 192 | 40 | 15.0 |
| N$_2$ | | |
| 1 | Ambient | 0.80 |
| 47 | Ambient | 0.80 |
| 48 | 40 | 1.1 |
| 72 | 40 | 1.05 |
| 96 | 40 | 0.82 |
| 120 | 40 | 0.7 |
| 144 | 40 | 0.96 |
| 168 | 40 | 0.98 |
| 192 | | 0.82 |

It is to be noted from the above tables that the cellulose acetate membranes which were crosslinked with a titanate possessed a higher flux rate as well as a lower rate of flux decline than did the normal cellulose acetate membrane. In addition, the compaction factor slope of a log (Flux) vs. log (time) plot for the crosslinked membrane is only 0.027 as compared to a compaction factor for the normal cellulose acetate membrane of 0.057. Therefore it is readily apparent that the crosslinked cellulose acetate membrane possessed an improved flux and an increased stability to temperature, pressure and moisture over that which is possessed by a plain or normal cellulose acetate membrane.

EXAMPLE VI

To demonstrate the efficacy of the titanate cross-linking and the increased solvent resistance of the cross-linked membranes, membranes cross-linked as shown in Example III as well as the reference uncross-linked membrane in Example IV were stored in acetone for 2 hours at ambient temperature. After this exposure the membranes were dried and their weight loss measured. The reference uncross-linked membrane was dissolved off the backing corresponding to a weight loss of 24.5%. Membranes cross-linked in a solution containing 3.7% tetra(isopropyl) titanate had a weight loss of only 4.4%, while those cross-linked in solutions of ~9% titanate showed essentially no weight loss. These results are shown in Table 1.

We claim our invention:

1. A gas selective membrane which is prepared by treating a cellulose acetate membrane with a cross-linking agent comprising an organic titanate possessing the generic formula TiRR'R"R'" in which R, R', R" and R'" are selected from the group consisting of alkoxy, aroxy, aralkoxy, alkaroxy, alkylketoalkoxy and carboxylate radicals in an organic solvent solution which possesses a low polarity and surface-tension at cross-linking conditions, and recovering the resultant cross-linked gas selective cellulose acetate membrane.

2. The gas selective membrane of claim 1 further characterized in that said cellulose acetate membrane is subjected to treatment with a series of solvents of decreasing polarity at treatment conditions prior to contact with said cross-linking solution.

3. The gas selective membrane of claim 2 in which said cross-linking and said treatment conditions include a temperature within the range of from about 0° to about 100° C. and a pressure within the range of from about atomspheric to about 100 pounds per square inch gauge.

4. The gas selective membrane as set forth in claim 3 in which said cross-linking and said treatment conditions include a temperature within the range of from about 0° C. to about 50° C.

5. The gas selective membrane of claim 2 in which said solvents of decreasing polarity are selected from the group consisting of alcohols, paraffinic hysrocarbons, aromatic hydrocarbons and mixtures thereof.

6. The gas selective membrane as set forth in claim 5 in which said alcohol contains from 2 to about 5 carbon atoms.

7. The gas selective membrane as set forth in claim 6 in which said alcohol comprises isopropanol.

8. The gas selective membrane as set forth in claim 6 in which said alcohol comprises butanol.

9. The gas selective membrane as set forth in claim 5 in which said paraffinic hydrocarbon comprises pentane.

10. The gas selective membrane as set forth in claim 5 in which said paraffinic hydrocarbon comprises hexane.

11. The gas selective membrane as set forth in claim 5 in which said aromatic hydrocarbon is toluene.

12. the gas selective membrane of claim 1 in which the alkyl portion of said organic titanate contains from 1 to about 16 carbon atoms.

13. The gas selective membrane as set forth in claim 12 in which said organic titanate comprises tetraisopropyl titanate.

14. The gas selective membrane as set forth in claim 12 in which said organic titanate comprises tetrabutyl titanate.

15. The gas selective membrane as set forth in claim 12 in which said organic titanate comprises tetra(2-ethylhexyl) titanate.

16. The gas selective membrane as set forth in claim 12 in which said organic titanate comprises tetradecyl titanate.

17. The gas selective membrane as set forth in claim 1 in which said organic solvent for said organic titanate comprises hexane.

18. The gas selective membrane as set forth in claim 1 in which said organic titanate is present in said organic solvent solution in a range of from about 0.1% to about 25% by weight of said solution.

19. The gas selective membrane as set forth in claim 1 in which said organic titanate is present in said cellulose acetate membrane in a range of from about 0.1% to about 2% by weight of said membrane.

* * * * *

UNITED STATES PATENT AND TRADEMARK OFFICE
CERTIFICATE OF CORRECTION

PATENT NO. : 4,932,986

DATED : June 12, 1990

INVENTOR(S) : Kulkarni et al.

It is certified that error appears in the above-identified patent and that said Letters Patent is hereby corrected as shown below:

Column 1, line 6: "process" should read --processes--;

line 38: "applictions" should read --applications--;

line 60: "alcoholsoluble" should read --alcohol-soluble--.

Column 2, line 54: "posses" should read --possess--.

Column 3, line 6: "posssess" should read --possess--;

line 40: "hexame" should read --hexane--;

line 57: "posses" should read --possess--.

Column 4, line 41: "n-pentanl" should read --n-pentanol--;

line 56: "mixture" should read --mixtures--.

Column 5, line 1: "subuambient" should read --subambient--;

line 6: "operation" should read --operating--;

line 17: "tetra-t-butoxide" should read --tetra-$\underline{t}$-butoxide--;

line 58: "predeterminded" should read --predetermined--;

line 61: "in a greater" should read --in greater--.

UNITED STATES PATENT AND TRADEMARK OFFICE
CERTIFICATE OF CORRECTION

PATENT NO. : 4,932,986                                      Page 2 of 2

DATED : June 12, 1990

INVENTOR(S) : Kulkarni et al.

It is certified that error appears in the above-identified patent and that said Letters Patent is hereby corrected as shown below:

Column 6, line 7:   "selcetive" should read --selective--;

line 13:  "backing passed" should read --backing being passed--;

line 41:  "sujecting" should read --subjecting--;

line 56:  "degasssing" should read --degassing--.

Column 7, line 22:  "mmbrane" should read --membrane--.

Column 9, line 18:  "atomospheric" should read -atmospheric--;

line 26:  "hysrocarbons" should read --hydrocarbons--.

Column 10, line 9:  "the" should read --The--.

Signed and Sealed this

Third Day of March, 1992

*Attest:*

HARRY F. MANBECK, JR.

*Attesting Officer*     *Commissioner of Patents and Trademarks*